Figure 1:
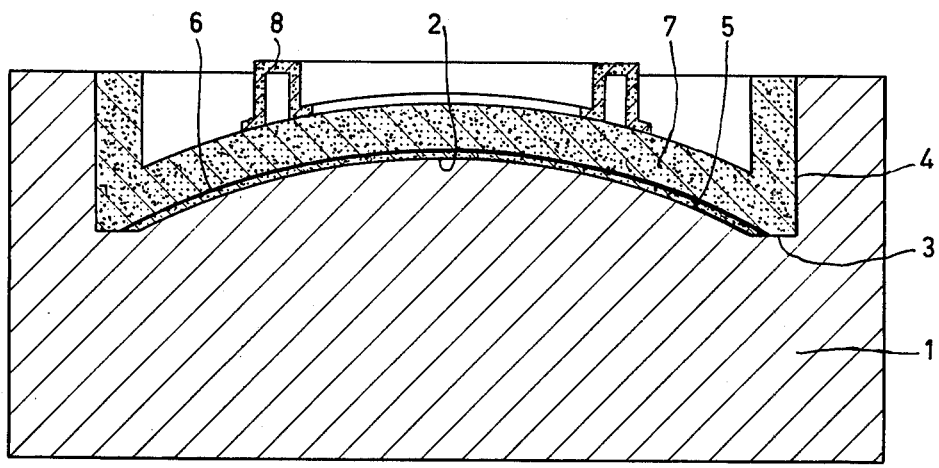

United States Patent [19]

Withoos et al.

[11] 4,188,358
[45] Feb. 12, 1980

[54] METHOD OF MANUFACTURING A METALLIZED PLASTIC REFLECTOR

[75] Inventors: Wilhelmus H. C. Withoos; Gerhardus A. te Raa; Johannes Sprengers, all of Eindhoven, Netherlands

[73] Assignee: U.S. Philips Corporation, New York, N.Y.

[21] Appl. No.: 777,036

[22] Filed: Mar. 14, 1977

[30] Foreign Application Priority Data

Mar. 29, 1979 [NL] Netherlands ............... 7603245

[51] Int. Cl.² ............... B22D 23/08; B29C 24/00; B29C 25/00
[52] U.S. Cl. ............... 264/255; 156/245; 264/257; 264/309; 264/347
[58] Field of Search ............... 264/129, 134, 135, 137, 264/250, 309, 255, 104, 257, 258, 236, 347; 428/118, 388, 389, 381, 432; 427/423, 427, 372 R; 343/912, 915; 204/20

[56] References Cited

U.S. PATENT DOCUMENTS

| 2,682,491 | 6/1954 | Hahn | 343/912 |
|---|---|---|---|
| 2,747,180 | 5/1956 | Bruckner | 343/912 |
| 2,805,974 | 9/1957 | Brucker | 156/153 |
| 2,948,896 | 8/1960 | Hart | 343/912 |
| 3,029,423 | 4/1962 | Sokol | 343/912 |
| 3,150,030 | 9/1964 | Mondano | 343/912 |
| 3,305,460 | 2/1967 | Lacy | 204/20 |
| 3,342,626 | 9/1967 | Batchelor | 427/423 |
| 3,395,059 | 7/1968 | Butler et al. | 264/104 |
| 3,770,571 | 11/1973 | Alsberg et al. | 204/20 |
| 3,811,934 | 5/1974 | Glaser | 427/423 |
| 3,897,294 | 5/1974 | MacTurk | 156/245 |
| 3,916,418 | 10/1975 | Erdman et al. | 343/912 |
| 4,030,953 | 6/1977 | Rutschow et al. | 343/912 |

FOREIGN PATENT DOCUMENTS

871863  7/1961  United Kingdom.

OTHER PUBLICATIONS

Lyman et al., Metals Handbook, vol. 1, (1961), Am. Soc. for Metals, Metals Park, Ohio p. 846.
Weast et al., Handbook of Chem. and Physics, Chemical Rubber Co., Cleveland, Ohio, 52 Ed. (1972), pp. D140–D142.

*Primary Examiner*—W. E. Hoag
*Attorney, Agent, or Firm*—Algy Tamoshunas

[57] ABSTRACT

The invention relates to a method of manufacturing a metallized plastic reflector in which a layer of fibrous material is provided on the convex surface of a mold. The layer is then just saturated with a thermohardening synthetic resin, and after partial hardening, a metal layer is applied onto the partially hardened resin layer by means of a spraying process. A supporting layer of a fiber reinforced thermohardening synthetic resin is then provided on the metal layer and after hardening the reflector is finally removed from the mold.

6 Claims, 2 Drawing Figures

METHOD OF MANUFACTURING A METALLIZED PLASTIC REFLECTOR

The invention relates to a method of manufacturing a metallized plastic reflector for the reflection, in a converging manner, of electromagnetic radiation, in which a curved top layer of a fiber-reinforced synthetic resin, manufactured by using a mold is provided on its convex side with a metal layer which in turn is provided with a supporting layer of a synthetic resin reinforced with fibrous material.

Such a method is known from U.S. Pat. No. 3,150,030. According to this known method for fabricating parabolic reflectors or radar antennas a layer of resin, for example unsaturated polyester resin, is first provided over the surface of the mold. A completely resin-impregnated glass fiber is then laid on the resin layer and the assembly is hardened at a temperature of approximately 120° C. for a few hours. After hardening, the surface is roughened by sand-blasting. A fabric of metal strips is manufactured separately and, after having been etched, is provided with a layer of a phenolic adhesive.

The fabric of metal strips is deformed in accordance with the shape of the fiberglass mat disposed on the mold and is then adhered to the roughened surface of the mat. Thereafter a second layer of resin-impregnated glass fiber cloth is provided on the metal fabric, the assembly is evacuated, then hardened, and the resulting laminate is finally removed mechanically from the mold.

This known method has the drawback of being very cumbersome in operation and hence time-consuming, expensive and, in particular less suitable for mass production of reflectors. In addition, the fabric structure of the metal strips must be very fine to obtain optimum electrical properties, which impedes the deformation of the fabric and the correct permanent positioning thereof. The fineness of the metal fabric plays an important part particularly in the case of high frequency electromagnetic radiation for example, HF and SHF radiation having a frequency range of from 1 to 20 GHz.

It has, furthermore, been suggested to manufacture a plastic reflector by providing on a convex surface of a mold a supporting layer of glass fiber-reinforced polyester, then removing the mould after hardening, roughening the resulting concave surface of the supporting layer by sand-blasting, spraying thereon a metal layer and coating it with a layer of lacquer. The necessary roughening, however, causes the sprayed metal layer to have a rough surface, which leads to undesired electrical losses. Another drawback of this method is that the mold which determines the shape of the surface of the metal layer, has to be removed in between. This may give rise to deformation—however small this may be—of the concave surface of the supporting layer on which the metal layer is provided.

It has also been suggested in U.S. Pat. No. 3,536,800 to provide the convex surface of a mold with a film of polyvinyl alcohol, spraying thereon a metal layer and finally providing a supporting layer of, for example, glass fiber-reinforced polyester. As compared with the above-described method, this method has the advantage that the surface of the metal layer is less rough and more accurately conforms to the desired surface as determined by the mold. The drawback of the method is that the metal layer of the resulting reflector is not protected from attack by the surroundings, for example weather influences. It has furthermore been found in practice to be very cumbersome to conform a polyvinyl alcohol film very smoothly to the mould. This is successful when the mold is sprayed with a solution of polyvinyl alcohol and the solvent is then evaporated. However, in that case problems arise in detaching the mold from the polyvinyl alcohol film. It has also been found that during spraying of the metal, the polyvinyl alcohol film can readily become locally detached from the mold.

The invention relates to a method of manufacturing a metallized plastic reflector without the above-mentioned drawbacks. The invention relates, in particular, to a method of manufacturing a metallized plastic reflector for convergent reflection of electromagnetic radiation, in which a curved top layer of fiber-reinforced synthetic resin manufactured by using a mold is provided on its convex side with a metal layer which in turn is provided with a supporting layer of synthetic resin reinforced with fibrous material. In accordance with the invention, a film or fabric of fibrous material provided over a convex surface of a mold is saturated with a thermohardening synthetic resin. After partial hardening of the resin, a layer of metal is then applied on the resin by a spraying process. Thereafter, a supporting layer of a thermohardening synthetic resin reinforced with fibrous material is provided on the metal layer and finally, after hardening of the assembly, the mold is removed.

The fibrous material from which the fabric is manufactured preferably consists of glass fibers. Other fibers, for example carbon fibers and synthetic resin fibers, may also be used. As regards the fibers of synthetic resin, it is to be noted that those synthetic resins are useful of which fine fibres can be spun and which are both chemically inert, hence are not attached by the thermohardening synthetic resin provided thereon, and are electrically inert, so that they do not cause large electrical losses by scattering of the electromagnetic radiation. Suitable synthetic resin for the fibers is, for example, saturated polyester and plastic synthetic resins, such as nylon and polyamide. If the fibrous material used is slightly less flexible, as is the case, for example, with polyester fibers, it is recommended to construct the fibrous layer in segments and to conform them continuously and smoothly to the mould. The thickness of the layer should not be too large because in the case of larger thicknesses electrical losses become significant and furthermore the contours of the mold cannot be followed easily. A suitable thickness for the layer saturated with the thermohardening synthetic resin is roughly between 0.2 and 0.5 mm and is preferably 0.3–0.4 mm. The diameter of the fibers in the layer is not restricted to narrow limits. Both finer fibers having a diameter of approximately $7\mu$ and coarser fibers having a diameter of approximately $10\mu$ may be used. The structure of the layer may consequently be rather coarse, for example, it may be formed by a roving mat having a weight of 225 g/m$^2$, or alternatively, it may be very fine, for example a mat having a weight less than 100 g/m$^2$. A thin layer having a fine structure is to be preferred, as will be explained hereinafter.

Before fibrous layer the film or fabric on the convex surface of the mold, the surface of the mold is provided with a release agent. Of course, the type of release agent depends on the synthetic resin used in the fibrous layer. For polyester resin, example, a wax, for such as a natural wax or a synthetic wax, may be used as an release agent. Polyvinyl alcohol may also be used. The layer must be arranged carefully and in particular smoothly, against the surface of the mold after which the it is saturated with a thermohardening synthetic resin. This preferably is an unsaturated polyester resin but other known thermohardening synthetic resins, for example, an epoxy resin, may also be used.

As compared with a polyester resin, an epoxy resin is slightly more viscous, in general requires a longer hardening time and is slightly more difficult to process so that polyester resin is to be preferred. Such an unsaturated polyester resin comprises the usual ingredients necessary for hardening, for example, monostyrene, as well as an accelerator, for example, an organic amine such as dimethylaniline, and a hardener, for example, an organic peroxide, such as benzoyl peroxide. The resin preferably contains no paraffin. In this connection it is to be noted that oxygen, for example atmospheric oxygen, impedes the hardening. By the addition of paraffin the resin is sealed from atmospheric oxygen so that a complete hardening is reached. In the method according to the invention the resin is not hardened entirely. This can be achieved by omitting paraffin from the resin so that the outermost layer of the resin exposed to air is not fully hardened and has a slightly sticky consistency. It is also characteristic for the method according to the invention that the fibrous layer is saturated with resin. This is to be understood to mean that the surface of the layer remote from the mold should not be covered with a layer of resin in which no fibers are present.

In a favourable embodiment of the method according to the invention, a film or fabric of glass fibers is used which is saturated with a polyester resin in such manner that the glass fibers on the side remote from the mold are just above or closely below the surface of the resin. The outermost fibers are then either just covered with or project slightly beyond the resin.

After hardening the resin at room temperature in the above-described manner, a layer of metal is sprayed on the surface according to a usual spraying method. The metal adheres very readily to the substratum and furthermore does not crack after a longer period of time. This very favourable characteristic is obtained according to the invention if, as stated above, the surface the top layer on which the liquid metal particles are sprayed is not fully hardened and the fibrous layer is just saturated with resin.

Both aspects for obtaining a readily adhering and optimum metal layer are based on the recognition gained by Applicants and supported by experiments that the fibers, for example glass fibers situated at the top of the layer, interlock with the metal layer sprayed onto the fibrous layer. In other words, the fibers at the surface to be sprayed constitute bridges to which the sprayed metal adheres. It has been found that when the fibers are just coated with resin a good bond is formed between the metal layer and the fibrous layer in that the pressure and thermal loads exerted on the top layer when it is sprayed with metal drops, partly release the fibers disposed just below the surface so that the metal surrounds and adherrs to the released fibers. Fibers projecting just beyond the resin layer are thus easily reached by the sprayed metal, thereby forming bridges to which the metal layer adheres. The resin between the bridges is usually forced back slightly one can speak of bridge parties for locking the metal layer.

It should be noted that according to the method of the invention the top layer need not be roughened, for example by sand-blasting. Furthermore, no adhesives, for example glues, are used.

The metal may be sprayed according to a known method, for example, by means of wire spraying, sometimes known as the Schoop method, in which a metal wire is melted in a flame of, for example, acetylene-oxygen and sprayed by compressed air. A metal powder spraying process may also be used in which metal powder is melted in a flame and is transported by the flame to the surface to be treated. In the method of the invention various metals may be used. When a monolayer of metal is considered, that is a layer of the same composition, metal or metal alloys having a melting point of 150°-700° C. are preferable.

In a favourable embodiment, a layer of Sn/Sb metal alloy having a melting range of 240°-350° C. is provided by a flame spraying process on the film or fabric of glass fibers saturated with synthetic resin.

Examples of other metals which may be used are Zn having a melting point of 420° C. and Al having a melting point of 660° C. The metal layer may also be formed from several layers each of a different composition. In this case a lower melting point metal, for example Zn, is provided on the layer of synthetic resin and then a higher melting point metal, for example Cu, is sprayed on the Zn layer.

The electromagnetic radiation reflecting metal layer provided according to the method of the invention is very accurate, that is, conforms very accurately to the convex surface of the mold which corresponds to the desired theoretical surface, for example, a parabolic surface. Furthermore, the reflecting metal layer has an excellent surface accuracy which is of great importance for the electrical properties of the reflector, in particular to obtain a minimum scattering of the incident electromagnetic radiation. In this connection it should be noted that a reflector made by the method of the invention is particularly suited for application in the HF (high frequency) and SHF (super high frequency) frequency range of approximately 1-20 GHz. In particular the reflector may be used in antennas, especially satellite antennas, operating at a power of a few hundred watts for example 200 watts, and a frequency of approximately 12 GHz.

This high frequency implies a wavelength of a few centimeters (microwaves), which means that very stringent requirements have to be imposed upon the shape accuracy and surface accuracy of the reflecting metallic surface.

Moreover, the accuracy has to be realized for a comparatively large area. For example, with a satellite power of 200 watts, a reflector diameter of approximately 1.6 m is necessary.

The metal layer obtained by the method according to the invention has a surface accuracy of 0.3–0.5 mm with the above-mentioned diameter of approximately 1.6 m. This value is calculated using the "root mean square" method according to the formula $$r.m.s. = \epsilon_n (x_i - x)^2 / n - 1,$$

where $i = 1 - n$, $x_i$ is the measured value and $x$ is the theoretical value.

The shape accuracy is improved if the thickness of the fibrous layer is small. For attaining optimum shape accuracy it is also advantageous to use a layer of very fine fibers, for example glass fibers. The layer can then optimally conform to the contours of the mold. Furthermore, the use of fine fibres improves the adhesion of the metal layer to the top layer. It will be obvious that with fine fibers the number of locking places or bridges with which the metal layer is bonded to the substratum is larger than when coarser fibers are used.

Due to cost considerations the thickness of the metal layer is restricted. Applicants have found that the metal layer sprayed according to the invention has a liquid-permeable porous structure. This phenomenon which depends on the thickness of the metal layer is still present in the case of a thickness of $100\mu$. A suitable thickness of the metal layer is between 20 and $80\mu$ and is preferably approximately $30\mu$.

On the metal layer is provided a supporting layer which mainly determines the strength and rigidity of the finished reflector. The supporting layer comprises a fibrous material-reinforced thermohardening synthetic resin. In addition to being strong, the construction should also be of light weight. Suitable fibrous materials for this purpose are those which have been described above with reference to the top layer. Glass fibres are to be preferred which may or may not be used in the form of a fabric or film. An epoxy resin or a polyester resin is preferably used as a thermohardening synthetic resin.

Upon providing the supporting layer, the liquid resin thereof will adhere to the synthetic resin present in the top layer via the pores in the metal layer. As a result of this, the reflecting metal layer is very readily enclosed between the top layer and the supporting layer, with the extra advantage in that it minimizes the possibility of deformation of the metal layer.

The thickness of the supporting layer depends on the requirements imposed as regards the strength of the reflector and is usually from 2 to 10 mm. A favourable thickness for a reflector diameter of 1.6 m is 3-6 mm. On the side remote from the metal layer, the supporting layer may be provided with reinforcement ribs or rings for mounting the reflector onto a stand and for attachment of apparatus such as a motor for moving the reflector relative to the stand. Such reinforcement members may be fabricated, for example, from glass fiber-reinforced polyester and may be provided in the usual manner, for example, by lamination. After constructing the supporting layer with reinforcement members, the assembly is hardened, for example at room temperature, and finally removed from the mold.

Figure 2:
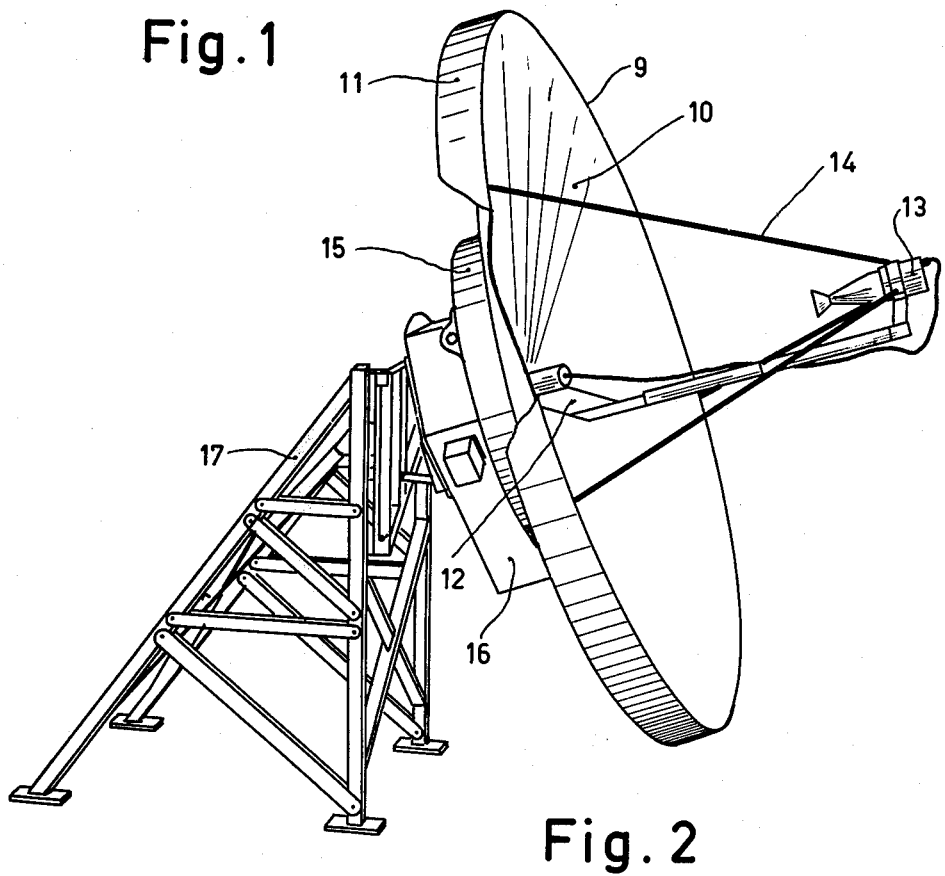

The invention will now be described in greater detail with reference to the drawing, in which FIG. 1 is a cross-sectional view of a mold with reflector manufactured thereon, and FIG. 2 is an elevation of a satellite antenna having a reflector manufactured according to the invention.

Referring now to FIG. 1, the mold 1 which may be made from wood, synthetic resin or metal, has a parabolic surface 2 with a diameter of 1.6 m. The parabolic surface 2 is ground very smooth and is bounded by a horizontal ring 3 having an upright edge 4. The surface 2 is provided with a release agent for polyester resin, in this case a wax, and a glass fiber layer 5, 0.3 mm thick, and weighting 100 g/m², which is then very carefully conformed to the surface 2. The layer 5 is filled just up to saturation with a polyester resin solution which contains, in addition to the unsaturated polyester monostyrene, dimethyl aniline and benzoylperoxide. The solution contains no paraffin. After the resin is applied, the structure of the layer 5 is still visible so that the upper surface of the layer is immediately below the surface of the resin. The resin is hardened at normal temperature and because of the absence of paraffin, the outermost layer of resin does not fully harden but has a sticky consistency. A layer 6 of an Sn-Sb alloy (melting range 240°–350° C.) is then provided on the layer 5 saturated with resin by means of flame spraying. The "shows" layer has a thickness of $30\mu$ and shows a porous structure which is not visible with the naked eye. The metal layer 6, ring 3 and edge 4 are provided with a supporting layer 7 of glass fiber-reinforced polyester resin which is applied in the usual manner, for example, by rolling. This time the polyester resin does contain paraffin. The glass fibers used in the supporting layer are preferably positioned in a fabric having a weight of approximately 200 g/m². The resin of supporting layer 7 adheres to the resin present in the layer 5 via the metal layer 6. A reinforcement ring 8 consisting of glass fiber reinforced polyester is provided on the layer 7 which has a thickness of 4 cm. After hardening, the assembly is finally removed from the mold 1.

FIG. 2 shows a reflector 9 manufactured according to the invention and having a parabolic surface 10 with a diameter of 1.6 m. On its circumference the reflector has an upright edge 11, 10 cm wide, and centrally it is provided with a supporting member 12 for a reflector horn 13. Supporting member 12 has a stabilizer 14. The reflector furthermore comprises, on the side remote from the supporting member 12, a reinforcement ridge 15 to which is connected an apparatus, in this case a motor 16 with stand 17.

What is claimed is:

1. A method for fabricating an antenna reflector comprising the steps of coating a surface of a mold with a first layer of fibrous material, saturating said first layer with a thermo-hardening synthetic resin, partially hardening said resin and while said resin is still only partially hardened and has a slightly sticky surface, coating said sticky surface with a metal layer by flame spraying to form a reflector for electromagnetic radiation and applying a supporting layer onto said metal layer.

2. The method according to claim 1 wherein said applying step includes applying onto said metal layer a second layer of fibrous material impregnated with thermo-hardening synthetic resin and hardening said resin in said second layer to form said supporting layer, and including the step of removing from said mold the assembly formed by said first layer and said supporting layer with said metal layer therebetween.

3. The method according to claim 1 wherein said metal is an alloy of tin and antimony.

4. The method according to claim 1 wherein said resin is a polyester resin.

5. The method according to claim 4 wherein said fibrous material includes glass fibers.

6. The method according to claim 5 wherein said saturating step is performed in a manner such that said first layer is filled with said resin to a point slightly below the surface thereof remote from said surface of said mold so that some fibers of said first layer project beyond said resin.

* * * * *